(12) United States Patent
Trikha

(10) Patent No.: US 6,755,375 B2
(45) Date of Patent: Jun. 29, 2004

(54) METHOD AND APPARATUS FOR CONTROLLING AIRCRAFT DEVICES WITH MULTIPLE ACTUATORS

(75) Inventor: Arun K. Trikha, Bellevue, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/282,792

(22) Filed: Oct. 28, 2002

(65) Prior Publication Data

US 2004/0075020 A1 Apr. 22, 2004

Related U.S. Application Data

(60) Provisional application No. 60/420,667, filed on Oct. 22, 2002.

(51) Int. Cl.[7] .............................................. B64C 13/42
(52) U.S. Cl. ....................... 244/75 R; 244/78; 244/213; 91/509
(58) Field of Search .............................. 244/75 R, 78, 244/221, 226, 227; 91/509–510, 363 A, 364, 367

(56) References Cited

U.S. PATENT DOCUMENTS

| | | | | |
|---|---|---|---|---|
| 3,683,749 A | * | 8/1972 | Bayles | 91/438 |
| 4,426,911 A | * | 1/1984 | Robinson et al. | 244/75 R |
| 4,533,097 A | * | 8/1985 | Aldrich | 244/78 |
| 4,759,515 A | * | 7/1988 | Carl | 244/76 R |
| 4,762,294 A | * | 8/1988 | Carl | 244/75 R |
| 5,074,495 A | * | 12/1991 | Raymond | 244/78 |
| 6,241,182 B1 | * | 6/2001 | Durandeau et al. | 244/75 R |

OTHER PUBLICATIONS

Boeing Airliner Magazine, Oct./Dec. '94, p. 13, Figure 5.
Electrically Powered Actuators, Aerospatiale Matra Airbus 2000 (1 page).

* cited by examiner

*Primary Examiner*—Galen L. Barefoot
(74) *Attorney, Agent, or Firm*—Perkins Coie LLP

(57) ABSTRACT

Methods and apparatuses for controlling aircraft devices with multiple actuators. An apparatus in accordance with one embodiment of the invention includes a first actuator coupled to a first power system having a first probability of failure, the first actuator being coupleable to at least one moveable component of an aircraft system. The apparatus can further include a second actuator coupled to a second power system having a second probability of failure less than the first. The second actuator can be operatively coupled to the first actuator and can be coupleable to the at least one moveable component, for example, to operate simultaneously with the first actuator. A second force applied by the second actuator can be less than a first force applied by the first actuator. Accordingly, the second power source can be reduced in size by virtue of the reduced probability of failure for the first power system.

60 Claims, 5 Drawing Sheets

METHOD AND APPARATUS FOR CONTROLLING AIRCRAFT DEVICES WITH MULTIPLE ACTUATORS

CROSS-REFERENCE TO RELATED APPLICATION

The present application claims priority to U.S. Provisional Application No. 60/420,667 filed Oct. 22, 2002 and incorporated herein in its entirety by reference.

TECHNICAL FIELD

The present disclosure relates to methods and apparatuses for controlling aircraft devices, such as flight control surfaces, with multiple actuators, such as a combination of electric and hydraulic actuators.

BACKGROUND

Existing commercial aircraft have a variety of flight control surfaces operated by redundant actuation systems. These redundant actuation systems may use hydraulically powered (or hydraulic) actuators, electrically powered (or electric) actuators or a combination thereof. Many current commercial aircraft use hydraulic actuators coupled to the aircraft rudder, elevators, ailerons, and other flight control devices. Electromechanical types of electric actuators (in which an electric motor drives a surface through a ball screw arrangement) are being used extensively on unpiloted vehicles, where the potential of a flight control surface jam is not a significant safety issue. Electrohydrostatic actuators or Integrated Actuator Packages (in which an electric motor drives a local hydraulic pump to provide hydraulic fluid flow to an actuator coupled to the flight control surface) have been flight tested and are being proposed for future aircraft. In one variation, known as an electrohydrostatic backup actuator, the actuator acts as a hydraulic actuator during normal operation (at which time it is powered by a central hydraulic system through a selector valve), but acts as an electrohydrostatic actuator in case the hydraulic system fails (at which time it is connected to an electric motor to pump hydraulic fluid through the same selector valve). While the foregoing actuators can provide requisite redundancies, there is a continual effort in the aircraft industry to further reduce component cost and weight to make the aircraft more cost effective to operate.

SUMMARY

The following disclosure describes methods and apparatuses for controlling aircraft devices with multiple actuators. An apparatus for controlling an aircraft system having at least one moveable component can include, in one aspect of the invention, a first power system having a first probability of failure, a second power system having a second probability of failure greater than the first, and a first actuator coupled to the first power system, the first actuator being coupleable to the at least one moveable component. The first actuator can be configured to apply a first force to the at least one moveable component. The apparatus can further include a second actuator coupled to the second power system and can be operatively coupled to the first actuator and coupleable to the at least one moveable component. The second actuator can be configured to apply a second force to the at least one moveable component, with the second force being less than the first force.

In another aspect of the invention, the first and second actuators can simultaneously act on the moveable component. The first power system can have a probability of failure of about $10^{-7}$ or less, and the second power system can have a probability of failure of about $10^{-5}$. The first actuator can include an electrically driven motor coupled to a hydraulic pump, and the second actuator can include a valve coupleable to a supply of hydraulic fluid pressurized by an aircraft engine.

A method for manufacturing an aircraft system having at least one moveable component can include, in a further aspect of the invention, coupling a first actuator to the at least one moveable component and to a first power system having a first probability of failure. The first actuator can be configured to apply a first force to the at least one moveable component. The method can further include operatively coupling a second actuator to the first actuator, the at least one moveable component, and a second power system having a second probability of failure greater than the first probability of failure. The second actuator can be configured to apply a second force to the at least one moveable component, with the second force being less than the first force.

A method for operating an aircraft system having at least one moveable component can include, in another aspect of the invention, applying a first force to the at least one moveable component via a first actuator coupled to a first power system having a first probability of failure, and applying a second force to the at least one moveable component via a second actuator coupled to a second power system having a second probability of failure greater than the first probability of failure. The second force can be applied simultaneously with the first force and can be less than the first force. If the first actuator fails, the method can further include applying only the second force to the at least one moveable component.

DETAILED DESCRIPTION

The following disclosure describes methods and apparatuses for controlling devices, such as aircraft flight control surfaces. Many specific details of certain embodiments of the invention are set forth in the following description and in FIGS. 1–5 to provide a thorough understanding of these embodiments. Some of these embodiments include methods for using hydraulic and electric actuators simultaneously in an active-active mode on the same flight control surface. Unlike existing actuation methods which typically use redundant actuators having similar sizes, embodiments of the invention include a hydraulic actuator that is smaller than the electric actuator it is paired with, thus reducing the actuation system weight and cost. Further embodiments are directed to coupling the actuators to power systems having different probabilities of failure. Aspects of this arrangement can result not only in reduced cost and weight, but also increased reliability. One skilled in the art, however, will understand that the present invention may have additional embodiments and that the invention may be practiced without several of the details described below.

Figure 1:
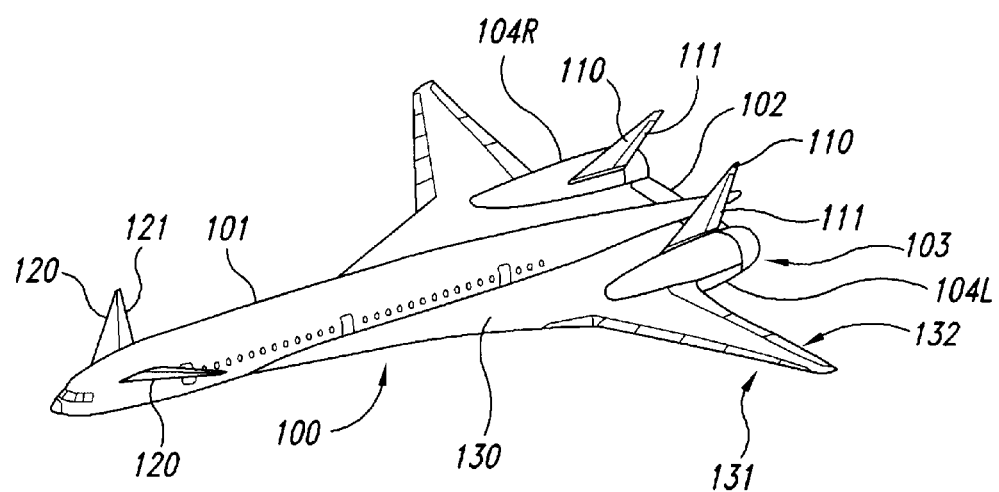
FIG. 1 is a partially schematic, isometric view of an aircraft having an actuator control system in accordance with an embodiment of the invention.

FIG. 1 is an isometric illustration of an aircraft 100 having a fuselage 101, canards 120 and a wing 130. A twin-engine propulsion system 103 can be integrated with the aft portion of the wing 130, and can include a left engine 104L and a right engine 104R. The wing 130 can include leading edge devices 131 (such as leading edge slats or flaps) and trailing edge devices 132 (such as ailerons). The aft portion of the wing 130 can include aft elevators 102 and the canards 120 can include forward elevators 121. Tails 110 can provide lateral stability for the aircraft 100 and can each include a rudder 111 for lateral control.

Figure 2:
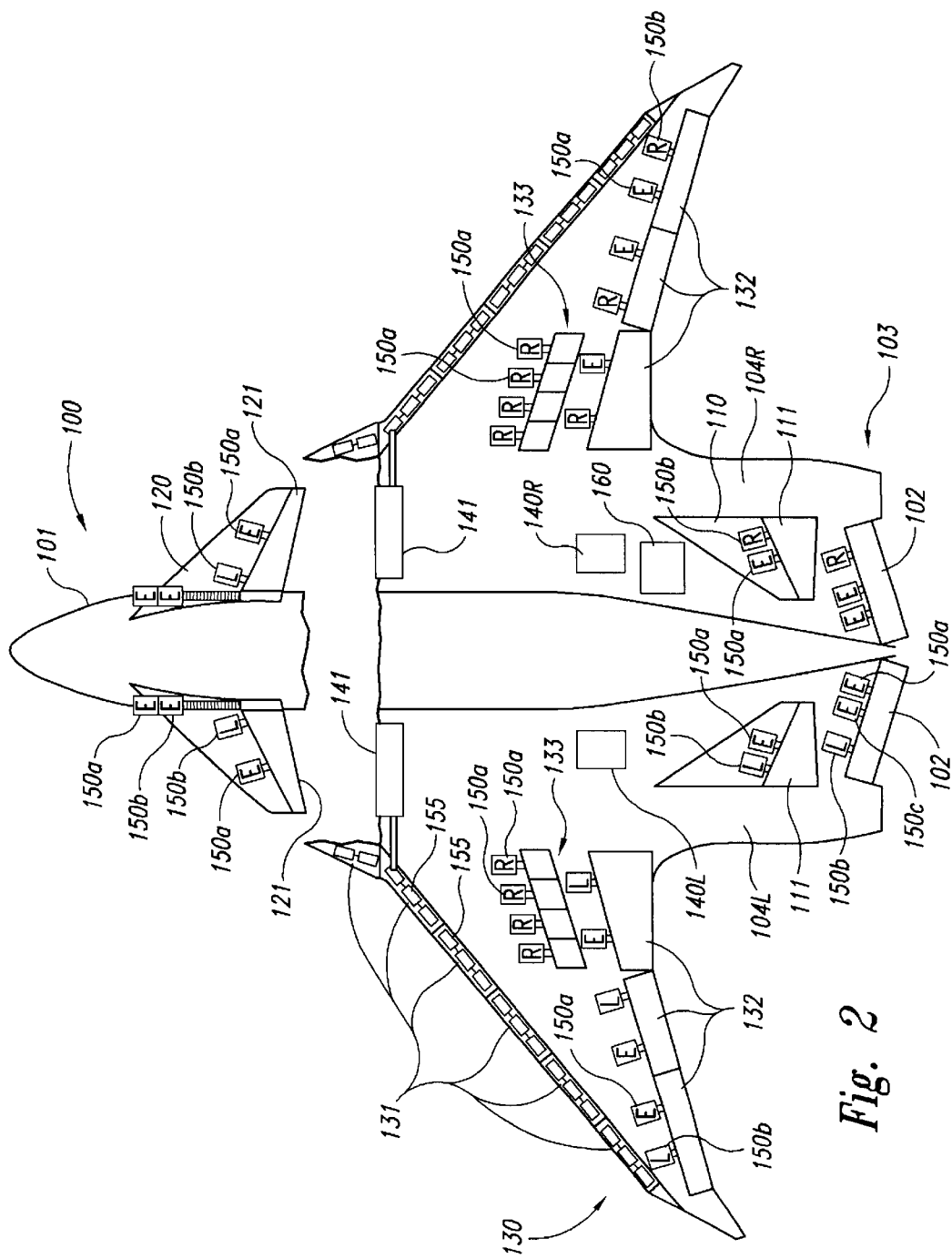
FIG. 2 is a partially schematic, broken top view of the aircraft shown in FIG. 1, with multiple actuators indicated schematically.

FIG. 2 is a partially schematic, broken top plan view of the aircraft 100 illustrating a flight control arrangement in accordance with an embodiment of the invention. In one aspect of this embodiment, several of the flight control surfaces are coupled to multiple, independently powered actuators 150 (shown as first, second and third actuators 150a–c) which can simultaneously act on the same flight control surface. One or more first power systems 160 can include one or more electrical generators coupled to one or more electrical transmission links (e.g., electrical busses). The electrical generator(s) can be coupled to the propulsion system 103 (e.g., the left engine 104L and/or the right engine 104R) to provide a first source of power for the actuators. One or more second power systems, such as pressurized hydraulic systems 140 (two are shown in FIG. 2 as a left hydraulic system 140L and a right hydraulic system 140R) are also coupled to the propulsion system 103 to provide a second source of power for the actuators. Each hydraulic system 140 can include one or more hydraulic pumps coupled to one or more hydraulic transmission links (e.g., hydraulic lines).

In one aspect of this embodiment, the electrical power system 160 can be coupled to both the left engine 104L and the right engine 104R. If one of the engines fails, the electrical power system 160 can still receive input energy from the other. Similarly, the hydraulic systems 140L, 140R may be powered by either one or both engines 104L, 104R, or an APU. The reliabilities of the individual electrical system 160 and the individual hydraulic systems 140 depend not only upon the number of generators or hydraulic pumps included in the systems, but also upon the characteristics of the hardware available to switch power from one hydraulic transmission line to the other, or from one electrical transmission line (e.g., bus) to another. The use of switching valves to switch to an alternate hydraulic line in the case of leakage in the first hydraulic line is discouraged on commercial aircraft due to an increased resulting potential for losing both hydraulic systems associated with the hydraulic lines. There is much less of a concern with switching between electrical busses. Thus, in general, the probability of a loss of an electrical system can be made to be significantly less than the probability of the loss of a hydraulic system.

In any of the foregoing embodiments, the electrical power system 160 can be coupled to some of the actuators 150 with the electrical transmission links (e.g., busses), and the hydraulic sources 140 can be coupled to other actuators 150 with hydraulic transmission links. For purposes of clarity, the electrical links and hydraulic links are not shown in FIG. 2. Instead, the actuators 150 are shown with an alphabetic character to indicate which power system they are coupled to. The letter "E" indicates that the corresponding actuator 150 is coupled to the electrical system 160, the letter "L" indicates that the corresponding actuator 150 is coupled to the left hydraulic system 140L, and the letter "R" indicates that the corresponding actuator 150 is coupled to the right hydraulic system 140R. Further details of these arrangements are described below.

In one aspect of this embodiment, the forward elevators 121 (coupled to the canards 120) are driven by a first actuator 150a and a second actuator 150b.

In a further aspect of this embodiment, the first actuator 150a is electrically powered, and the second actuator 150b is powered by the left hydraulic system 140L. In still a further aspect of this embodiment, the first actuator 150a and the second actuator 150b are coupled to the forward elevator 121 via separate actuator links. Accordingly, each actuator 150a, 150b can move the forward elevator 121 simultaneously with the other. Further aspects of this embodiment and advantages of this arrangement are described below with reference to FIG. 3.

Other flight control surfaces of the aircraft 100 can also include first and second actuators that receive power from different systems and can act simultaneously. For example, each trailing edge device 132 of the wing 130 can be coupled to an electrically powered first actuator 150a and a hydraulically powered second actuator 150b. The rudders 111 can be driven by a similar arrangement of different first and second actuators 150a, 150b.

In a further aspect of this embodiment, at least some of the flight control surfaces can be powered by more than two actuators. For example, the aft elevators 102 can include three actuators: an electrically powered first actuator 150a, a hydraulically powered second actuator 150b, and an electrically powered third actuator 150c. Other flight control surfaces can be coupled to a single actuator. For example, speed brakes 133 mounted to the wing 130 can each be coupled to a single hydraulically powered actuator. The leading edge devices 131 can be powered by rotary mechanical actuators 155, which are in turn powered by hydraulic fluid supplied by power distribution units 141. The power distribution units can be coupled to a hydraulic system 140, such as the left hydraulic system 140L. Still further flight control surfaces can be coupled to multiple actuators of the same type. For example, the canards 120 can be all-moving relative to the fuselage 101 and can be coupled to an electrically powered first actuator 150a and an electrically powered second actuator 150b.

Figure 3:
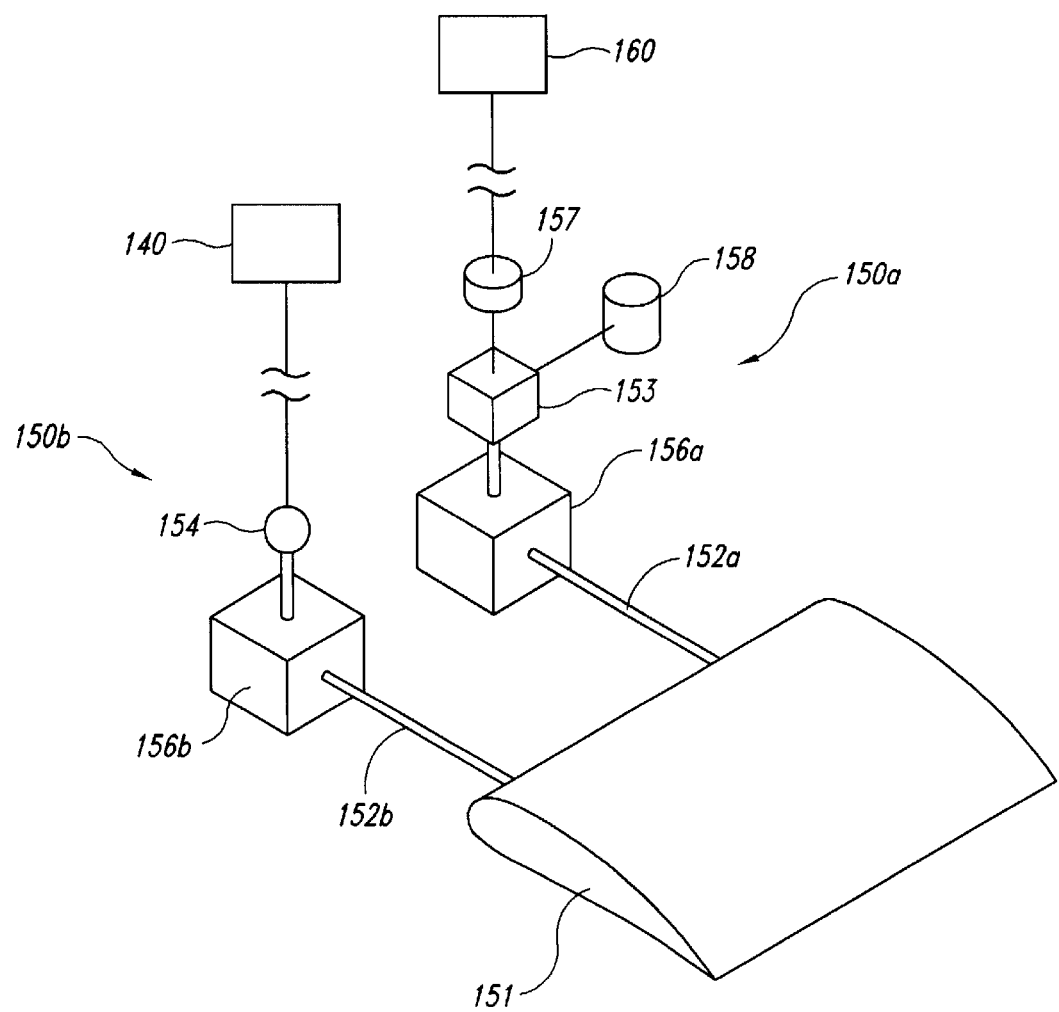
FIG. 3 is a partially schematic, isometric illustration of an actuated device coupled to first and second actuators in accordance with an embodiment of the invention.

FIG. 3 is a partially schematic, isometric illustration of an actuated device 151, (such as a flight control surface) coupled to multiple actuators that receive power from different systems. For example, the actuated device 151 can be coupled to a first actuator 150a with a first actuator link 152a. The actuated device 151 can also be coupled in parallel to a second actuator 150b with a second actuator link 152b. Both actuators 150a, 150b can operate simultaneously via the actuator links 152a, 152b to move the actuated device 151. Accordingly, the actuators 152a, 150b can be operatively coupled to each other via the actuated device 151. The actuators 152a, 150b together can provide the force (e.g., hinge moment) required for normal operation of the actuated device 151.

In one aspect of this embodiment, the first actuator 150a can be an electrically driven actuator, and can include an electric pump 153 coupled to a motor 157. The motor 157 can be coupled to the electrical system 160 or another first power system to pressurize hydraulic fluid from an independent reservoir 158. The pressurized hydraulic fluid moves the actuated device 151 via a first actuator transmission 156a and the first actuator link 152a. The second actuator 150b can be a hydraulic actuator that includes a hydraulic valve 154 coupled to one of the hydraulic systems 140 or another second power system. The second actuator 152b can accordingly move the actuated device 151 via a second actuator transmission 156b and the second actuator link 152b. Suitable first and second actuators 152a, 150b are available from actuator suppliers such as Parker Hannifin Corp. of Cleveland, Ohio.

In one aspect of this embodiment, the first power system can have a first probability of failure and the second power system can have a second probability of failure higher than the first. For example, when the first power system includes an electrical power system 160, the first power system can have a probability of failure of about $10^{-7}$ or less. When the second power system includes a hydraulic power system, the second power system can have a probability of failure of about $10^{-5}$. In one particular embodiment, the relatively low probability of failure for the first power system can be obtained by coupling multiple conventional electrical buses and providing switching that automatically switches from a first bus to a second bus if the first bus fails. In other embodiments, the first power system can include other arrangements that result in a relatively low probability of failure.

In a further aspect of the foregoing embodiment, the second power system can have a reduced size to take advantage of the reduced probability of failure associated with the first power system. For example, redundant actuator systems are typically designed with the assumption that if the power system for one (e.g., a first) actuator system fails, the other (e.g., a second) actuator system need only provide an actuation force sufficient to operate the flight control surface over a reduced operating range (e.g., to meet minimum aircraft control requirements). The allowable reduction in flight control surface range requirements to be met by the second actuator alone depends upon the probability of failure of the first actuator. Accordingly, (assuming that the first actuator system includes the first actuator 150a and the first power system, and the second actuator system includes the second actuator 150b and the second power system), the second actuator 150b can be sized to produce a lower force (and therefore the second power system can be sized to produce a lower level of power) because it is relatively unlikely that the first power system will fail and that the second actuator 150b will be required to operate by itself. An advantage of this feature is that because the second actuators 150b produce a lower level of force, they can be reduced in size and weight, reducing the overall weight of the aircraft. A further advantage of this feature is that the second power system can be made smaller and therefore lighter than if the second actuator is of the same (larger) size as the first actuator, thus further reducing the overall weight of the aircraft 100.

Another feature of an embodiment of the arrangement described above with reference to FIGS. 1–3 is that the first and second actuators 150a, 150b can operate simultaneously to move the actuated device 151. Accordingly, the force provided by one actuator 150 can supplement the force provided by the other during normal operation when the desired flight control surface range of motion is generally higher than during failure conditions.

Another feature of an embodiment of the arrangement described above with reference to FIGS. 1–3 is that, because the second power system can be smaller and can provide a lower level of power than existing redundant power systems, the power required by the flight control surfaces may define a lower fraction of the overall power produced by the second power system. For example, the hydraulic systems 140L, 140R can be sized to actuate non-flight control surfaces (such as the landing gear, brakes, and other utility functions) and, because the second actuators 150b are reduced in size, can include only minor modifications to also power the second actuators 150b. As described above, an advantage of this arrangement is that the overall size (and therefore weight) of the hydraulic systems 140L, 140R can be reduced when compared with existing aircraft hydraulic systems.

Figure 4A:
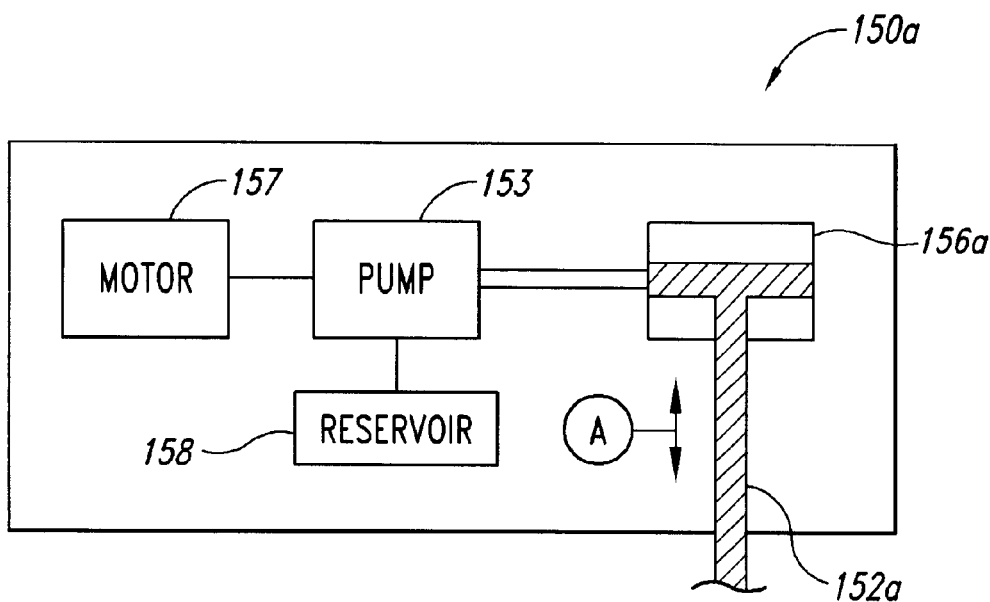
FIGS. 4A and 4B schematically illustrate electrically operated actuators in accordance with embodiments of the invention.

FIG. 4A is a schematic illustration of an embodiment of the first actuator 150a. In one aspect of this embodiment, the motor 157 can be a bi-directional, variable speed electrical motor. The pump 153 can be a fixed displacement pump coupled to an actuator transmission 156a. The actuator transmission 156a can include a cylinder in which a piston portion of an actuator link 152a moves axially, as indicated by arrow A. In another embodiment, the motor 157 can include a single speed electrical motor, and the pump 153 can include a bi-directional, variable displacement pump. In either embodiment, the actuator 150a can control the speed and/or direction with which the actuator link 152a moves the actuated device 151 (FIG. 3).

Figure 4B:
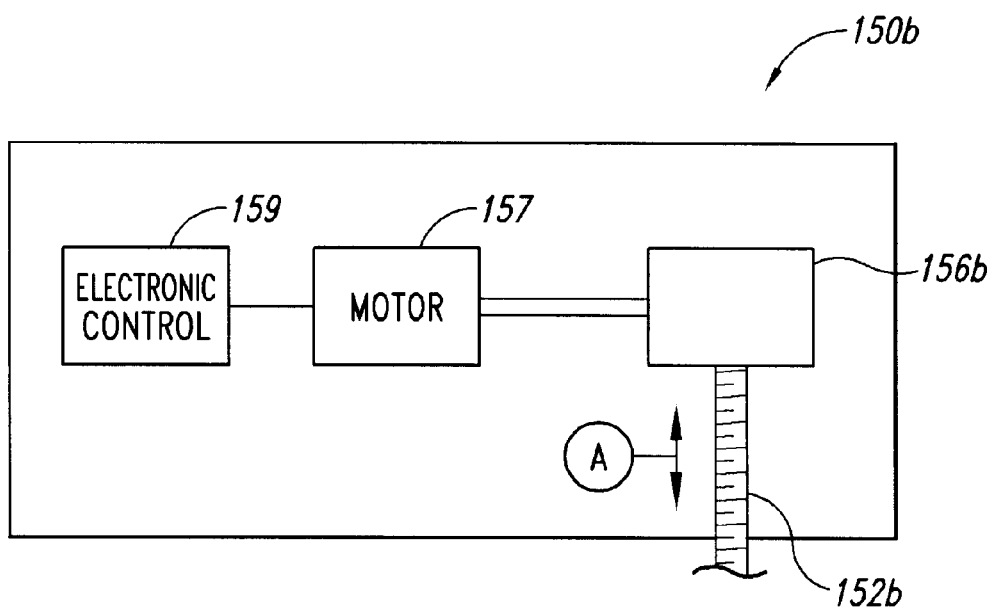

In yet another embodiment shown in FIG. 4B, an electrically powered actuator 150b can include an electronic control unit 159 coupled to a bi-directional, variable speed electrical motor 157. The motor 157 can be coupled to an actuator transmission 156b that converts rotational motion provided by the motor 157 to linear motion. Accordingly, the actuator transmission 156b can include a coupling for driving an actuator link 152b as indicated by arrow A. The actuator link 152b can include a lead screw, ball screw, worm gear or other axially moveable device. The arrangement shown in FIG. 4B may be less practical to install in parallel with a hydraulic actuator than the arrangement shown in FIG. 4A.

Figure 5:
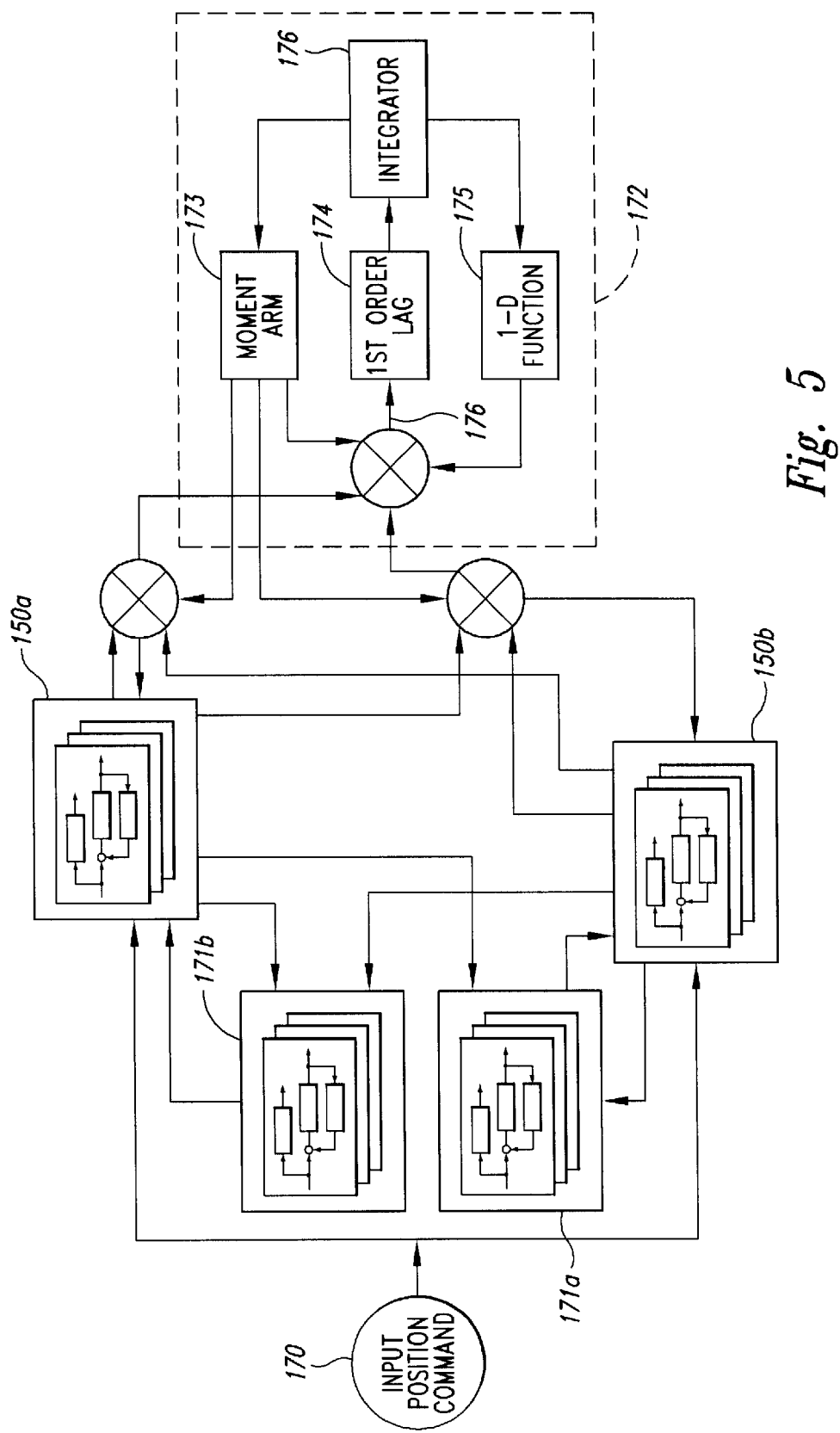
FIG. 5 is a block diagram illustrating a simulation for coupling multiple actuators in accordance with an embodiment of the invention.

FIG. 5 is a schematic illustration of a simulation that models an arrangement for coupling the first actuator 150a and the second actuator 150b described above with reference to FIG. 3. In one embodiment, the simulation can be performed using existing software products such as EASY5, available from MSC software of Santa Ana, California. In other embodiments, the simulation can be performed with other products. In any of these embodiments, an input position command 170 can be provided to the first actuator 150a and the second actuator 150b. Two load sharers 171 (shown as a first load sharer 171a and a second load sharer 171b) can be coupled between the actuators 150a, 150b to determine the relative force provided by each actuator 150. In an actual aircraft installation, the function provided by the load sharers 171 can be provided by software, hardware or other suitable arrangements coupled to the actuators 150a, 150b. Accordingly, the load sharers 171a, 171b can operatively couple the actuators 150a, 150b, which are also operatively coupled by virtue of their connection to the same actuated device.

The resulting forces provided by the actuators 150a, 150b are then summed to provide an output force 176. The output force 176 can be coupled to a surface model 172 that models the feedback characteristics of the actuated device 151 (FIG. 3). Accordingly, the surface model 172 can include an effective moment arm model 173, a first order lag model 174, a one-dimensional function 175, and an integrator 176. In other embodiments, the surface model 172 can include other features. In any of these embodiments, the simulation shown in FIG. 5 can provide a design and/or validation tool for an actual system that includes multiple actuators that (a) receive power from different systems, having different probabilities of failure, (b) operate simultaneously during normal operation, and/or (c) provide sufficient power to operate the actuated device if the remaining actuator(s) fail.

From the foregoing, it will be appreciated that specific embodiments of the invention have been described herein for purposes of illustration, but that various modifications may be made without deviating from the spirit and scope of the invention. For example, in many of the embodiments described above with reference to FIGS. 1–5, the actuated device includes a flight control surface. In other embodiments, the actuated device can include other aircraft components. In one embodiment, the actuator arrangements described above can be applied to aircraft generally similar to that shown in FIG. 1, and in other embodiments, such arrangements can be applied to aircraft having other configurations. In one embodiment, the first power system can be an electrical power system coupled to an electrical first actuator 150a, and the second power system can be a hydraulic power system coupled to a hydraulic second actuator 150b; in other embodiments, the power systems can have other configurations, and the power systems and actuators can be coupled with other arrangements. In further embodiments, the actuator arrangements can be installed on aircraft having any number of configurations different than that shown in FIG. 2. Accordingly, the invention is not limited except as by the appended claims.

I claim:

1. An apparatus for controlling an aircraft system having at least one moveable device, the apparatus comprising:
a first power system having a first probability of failure;
a second power system having a second probability of failure greater than the first probability of failure;
a first actuator coupled to the first power system, the first actuator being coupleable to the at least one moveable device of the aircraft system, the first actuator being configured to apply a first force to the at least one moveable device; and
a second actuator coupled to the second power system, the second actuator being operatively coupled to the first actuator and the at least one moveable device of the aircraft system, the second actuator being configured to apply a second force to the at least one moveable device, the second force being less than the first force.

2. The apparatus of claim 1 wherein the first power system includes a plurality of busses coupled to one or more electrical power generators.

3. The apparatus of claim 1 wherein the first actuator is configured to apply the first force simultaneously with the second actuator applying the second force during normal operation.

4. The apparatus of claim 1 wherein the first actuator includes an electrically powered actuator and wherein the second actuator includes a hydraulically powered actuator.

5. The apparatus of claim 1 wherein the first power system includes an electrical power system and the second power system includes a hydraulic power system.

6. The apparatus of claim 1, further comprising the aircraft system.

7. The apparatus of claim 1, further comprising the aircraft system, and wherein the aircraft system includes a moveable flight control surface.

8. The apparatus of claim 1 wherein the first power system has a probability of failure of about $10^{-7}$ or less.

9. The apparatus of claim 1 wherein the second power system has a probability of failure of about $10^{-5}$.

10. The apparatus of claim 1, further comprising a third actuator operatively coupled to the first and second actuators.

11. The apparatus of claim 1 wherein the first force and the second force together are sufficient to operate the moveable device over a normal operating range, and wherein the first force or the second force above alone is sufficient to operate the moveable device over a reduced operating range.

12. The apparatus of claim 1 wherein the first actuator includes an electrically driven motor coupled to a hydraulic pump.

13. The apparatus of claim 1 wherein the second actuator includes a valve coupleable to a supply of hydraulic fluid pressurized by one or more aircraft engines or electrical pumps.

14. The apparatus of claim 1 wherein the second actuator weighs less than it would if it were sized and configured to apply a third force approximately equal to the first force.

15. An apparatus for controlling an aircraft system having at least one moveable device, the apparatus comprising:
first power means for generating power, the first power means having a first probability of failure;
first actuator means for moving the at least one moveable device, the first actuator means being coupled to the first power means and coupleable to the at least one moveable device to apply a first force to the at least one moveable device;
second power means for generating power, the second power means having a second probability of failure greater than the first probability of failure; and
second actuator means for moving the at least one moveable device, the second actuator means being coupled to the second power means and operatively coupled to the first actuator means and being coupleable to the at least one moveable device to apply a second force to the at least one moveable device, the second force being less than the first force.

16. The apparatus of claim 15 wherein the first actuator means are configured to apply the first force simultaneously with the second actuator means applying the second force during normal operation.

17. The apparatus of claim 15 wherein the first actuator means include an electrically powered actuator and wherein the second actuator means include a hydraulically powered actuator.

18. The actuator of claim 15 wherein the first power means includes a plurality of busses coupled to one or more electrical generators and wherein the second power means include a hydraulic power system.

19. The apparatus of claim 15, further comprising the aircraft system.

20. The apparatus of claim 15, further comprising the aircraft system, and wherein the aircraft system includes a moveable flight control surface.

21. The apparatus of claim 15 wherein the first power means have a probability of failure of about $10^{-7}$ or less.

22. The apparatus of claim 15 wherein the second power means have a probability of failure of about $10^{-5}$.

23. The apparatus of claim 15, further comprising third actuator means operatively coupled to the first and second actuator means.

24. The apparatus of claim 15 wherein the first force and the second force together are sufficient to operate the at least one moveable device over a first operating range, wherein the first force alone is sufficient to operate the at least one movable device over a second operating range narrower than the first, and wherein the second force alone is sufficient to operate the at least one moveable device over a third operating range narrower than the second operating range.

25. The apparatus of claim 15 wherein the first actuator means include an electrically driven motor coupled to a hydraulic pump.

26. The apparatus of claim 15 wherein the second actuator means include a valve coupleable to a supply of hydraulic fluid pressurized by an aircraft engine.

27. The apparatus of claim 15 wherein the second actuator means have a weight that is less than a weight of another actuator means having a comparable design and configured to apply a third force approximately equal to the first force.

28. An aircraft, comprising:
a system having at least one moveable component;
a first power system having a first probability of failure;
a second power system having a second probability of failure greater than the first probability of failure;
a first actuator coupled to the at least one moveable device and the first power system, the first actuator being configured to apply a first force to the at least one moveable device; and
a second actuator operatively coupled to the first actuator and the at least one moveable device and the second power system, the second actuator being configured to apply a second force to the at least one moveable device, the second force being less than the first force.

29. The aircraft of claim 28 wherein the at least one moveable device includes at least a portion of an aircraft flight control surface device.

30. The aircraft of claim 28 wherein the first actuator is configured to apply the first force simultaneously with the second actuator applying the second force during normal operation.

31. The aircraft of claim 28 wherein the first actuator includes an electrically powered actuator and wherein the second actuator includes a hydraulically powered actuator.

32. The apparatus of claim 28 wherein the first power system has a probability of failure of about $10^{-7}$ or less.

33. The aircraft of claim 28 wherein the second power system has a probability of failure of about $10^{-5}$.

34. The aircraft of claim 28 wherein the first force and the second force together are sufficient to operate the moveable device over a normal operating range when the first and second actuators operate simultaneously, and wherein the first and second forces are each sufficient to operate the moveable device over a reduced operating range when each of the first and second actuators operates without the other.

35. The aircraft of claim 28 wherein the first actuator includes an electrically driven motor coupled to a hydraulic pump.

36. The aircraft of claim 28 wherein the second actuator includes a valve coupleable to a supply of hydraulic fluid pressurized by an aircraft engine.

37. An aircraft system, comprising:
a moveable flight control surface;
an electrical power system having a first probability of failure;
an electrically powered first actuator coupled to the electrical power system and the moveable flight control surface, the first actuator being configured to apply a first force to the moveable flight control surface;
a hydraulic power system having a second probability of failure greater than the first probability of failure; and
a hydraulically powered second actuator operatively coupled to the hydraulic power system, the first actuator and the moveable flight control surface, the second actuator being configured to apply a second force to the at least one component simultaneously with the first actuator applying the first force, the second force being less than the first force.

38. The system of claim 37 wherein the electrical power system has a probability of failure of about $10^{-7}$ or less and wherein the hydraulic power system has a probability of failure of about $10^{-5}$.

39. The system of claim 37 wherein the first force and the second force together are sufficient to operate the moveable component over a normal operating range, and wherein each of the first and second forces alone is sufficient to operate the moveable component over a reduced operating range.

40. A method for manufacturing an aircraft system having at least one moveable device, the method comprising:
coupling a first actuator to the at least one moveable device of the aircraft system and a first power system, the first power system having a first probability of failure, the first actuator being configured to apply a first force to the at least one moveable device; and
operatively coupling a second actuator to the first actuator, the at least one moveable device of the aircraft system, and a second power system, the second power system having a second probability of failure greater than the first probability of failure, the second actuator being configured to apply a second force to the at least one moveable device, the second force being less than the first force.

41. The method of claim 40 wherein coupling the first actuator includes coupling the first actuator to apply the first force simultaneously with the second actuator applying the second force during normal operation.

42. The method of claim 40 wherein coupling the first actuator includes coupling an electrically powered actuator to an electrical power system and wherein coupling the second actuator includes coupling a hydraulically powered actuator to a hydraulic power system.

43. The method of claim 40 wherein coupling the first actuator includes coupling the first actuator to a first power system having a probability of failure of about $10^{-7}$ or less.

44. The method of claim 40 wherein coupling the second actuator includes coupling the second actuator to a second power system having a probability of failure of about $10^{-5}$.

45. The method of claim 40, further comprising operatively coupling a third actuator to the first and second actuators.

46. The method of claim 40, further comprising selecting the first and second actuators to apply a first force and a second force which together are sufficient to operate the moveable device over a normal operating range, and wherein each of the first and the second forces alone is sufficient to operate the moveable device over a reduced operating range.

47. The method of claim 40, further comprising selecting the first actuator to include an electrically driven motor coupled to a hydraulic pump.

48. The method of claim 40, further comprising selecting the second actuator to include a valve coupleable to a supply of hydraulic fluid pressurized by an aircraft engine.

49. The method of claim 40, further comprising selecting the second actuator to have a weight that is less than a weight of another actuator having a comparable design and configured to apply a third force approximately equal to the first force.

50. A method for manufacturing an aircraft system, comprising:

coupling an electrically powered first actuator to a moveable device of an aircraft flight control surface assembly and to an electrical power system, the electrical power system having a first probability of failure, the first actuator being configured to apply a first force to the moveable device; and operatively coupling a hydraulically powered second actuator to the first actuator, the moveable device, and a hydraulic power system, the hydraulic power system having a second probability of failure greater than the first probability of failure, the second actuator being configured to apply a second force to the moveable device simultaneously with the first actuator applying the first force, the second force being less than the first force.

51. The method of claim 50 wherein coupling the first actuator to a moveable device of an aircraft flight control system includes coupling the first actuator to at least one of an aileron, a flap, an elevator and a canard surface.

52. A method for operating an aircraft system, comprising:

applying a first force to at least one moveable device of the aircraft system via a first actuator powered by a first power system having a first probability of failure;

applying a second force to the at least one moveable device via a second actuator powered by a second power system having a second probability of failure greater than the first probability of failure, wherein applying the second force includes applying the second force simultaneously with applying the first force, and wherein the second force is less than the first force; and if the first actuator fails, applying only the second force to the at least one moveable device.

53. The method of claim 52 wherein applying the first force to the at least one moveable device includes applying the first force to at least one of an aileron, a flap, an elevator and a canard surface.

54. The method of claim 52 wherein applying the first force via the first actuator includes applying the first force via an electrically powered actuator, and wherein applying the second force via the second actuator includes applying the second force via a hydraulically powered actuator.

55. The method of claim 52 wherein applying the first force via a first actuator includes applying the first force via a first actuator powered by a first power source having a probability of failure of about $10^{-7}$ or less.

56. The method of claim 52 wherein applying the second force via a second actuator includes applying the second force via a second actuator powered by a second power source having a probability of failure of about $10^{-5}$.

57. The method of claim 52, further comprising applying a third force to the at least one moveable device via a third actuator operatively coupled to the moveable device and the first and second actuators.

58. The method of claim 52 wherein applying the first force and the second force simultaneously includes applying the first and second forces at a level sufficient to operate the moveable device over a normal operating range, and wherein the applying only the first force or the second force includes applying the first force or the second force at a level sufficient to operate the moveable device over a reduced operating range.

59. The method of claim 52 wherein applying the first force via the first actuator includes applying the first force via an electrically driven motor coupled to a hydraulic pump.

60. The method of claim 52 wherein applying the second force via the second actuator includes applying the second force via a valve coupleable to a supply of hydraulic fluid pressurized by an aircraft engine.

* * * * *